United States Patent [19]

Daoust et al.

[11] Patent Number: 4,657,990
[45] Date of Patent: Apr. 14, 1987

[54] AROMATIC POLYETHERKETONES

[75] Inventors: Daniel J. M. Daoust, Brussels; Jacques J. Devaux, Namur; Roger M. Legras, Hannut; Jean P. Mercier, Kessel-Lo, all of Belgium; Eric Nield, Cleveland, England

[73] Assignee: Imperial Chemical Industries PLC, London, England

[21] Appl. No.: 690,246

[22] Filed: Jan. 10, 1985

[30] Foreign Application Priority Data

Jan. 19, 1984 [GB] United Kingdom ............... 8401411

[51] Int. Cl.$^4$ ................... C08F 283/00; C08G 14/00; C08G 16/00
[52] U.S. Cl. ..................................... 525/471; 525/534
[58] Field of Search .............................. 525/471, 534

[56] References Cited

U.S. PATENT DOCUMENTS 3,539,655 11/1970 Strachar et al. ................. 525/534
4,268,635 5/1981 Hoy et al. ......................... 525/534
4,419,486 12/1983 Rose ................................... 525/534

FOREIGN PATENT DOCUMENTS 1879 5/1979 European Pat. Off. .
41780 12/1981 European Pat. Off. .
1465686 8/1974 United Kingdom ............... 525/471
1484828 2/1977 United Kingdom .
1541568 3/1979 United Kingdom .
2090843 4/1982 United Kingdom .

Primary Examiner—Lucille M. Phynes
Attorney, Agent, or Firm—Cushman, Darby & Cushman

[57] ABSTRACT

A crystallizable thermoplastic aromatic polyetherketone, the polymeric chain of which contains the repeat unit

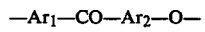

$$-Ar_1-CO-Ar_2-O-$$

where $Ar_1$ and $Ar_2$ are aromatic radicals which may be the same or different and comprise at least one aromatic ring, the polymeric chains having terminal ionic groups —A—X, where A is an anion and X is a metal cation. The anion is preferably selected from sulphonate, carboxylate, sulphinate, phosphonate, phosphate, phenate and thiophenate and the cation is preferably alkali metal or alkaline earth metal. The products may be used in blends with other polyetherketones as a nucleant for the other polyetherketones.

15 Claims, No Drawings

AROMATIC POLYETHERKETONES

This invention relates to thermoplastic aromatic polyetherketones having increased rates of crystallisation.

Polyetherketones are known which have exceptional high temperature performance and are being increasingly used in applications such as wire coating, injection moulding of shaped articles and structural composites containing reinforcing fibres. In such articles it is important that the crystallinity of the polymer is developed as far as possible during the fabrication process because subsequent use of an article which can continue to crystallise in use can result in dimensional changes occurring in the article with consequent warping or cracking and general change in physical properties. Salts such as sodium fluoride, which are generated in the polymerisation process have some influence on the crystallisation rate but such salts act as prodegradants at elevated temperatures so that any improvement in crystallisation behaviour obtained in this manner is accompanied by an unacceptable level of polymer degradation. When these salts are removed or counteracted with buffer materials the ability to crystallise more rapidly is lost. In some applications it is important to achieve a uniformity of crystalline texture and to maximise the number of crystallites regardless of increasing the rate of crystallisation.

The present invention enables the crystallisation rates of polyetherketones to be increased and/or enables a controlled morphology to be obtained. The products of the invention exhibit crystallisation parameters which are essentially constant even after prolonged treatment in the melt, and furthermore exhibit an essentially constant molecular weight when held in the melt for prolonged periods.

According to the invention there is provided a crystallisable thermoplastic aromatic polyetherketone, the polymeric chain of which contains the repeat unit $$-Ar_1-CO-Ar_2-O-$$

where $Ar_1$ and $Ar_2$ are aromatic radicals which may be the same or different and comprise at least one aromatic ring, the polymeric chains having terminal ionic groups —A—X, where A is an anion and X is a metal cation.

The divalent aromatic radicals $Ar_1$ and $Ar_2$ may comprise single, condensed or multiple aromatic rings, particularly 6-membered aromatic carbocyclic rings, the multiple rings being joined by a chemical bond or a linking group D selected from —O—, —S—, —CO— or —O—(CH$_2$)$_2$—O—. Preferably $Ar_1$ and $Ar_2$ are phenylene radicals. Groups of formula —SO$_2$— and —C(CH$_3$)$_2$— may be included to a limited extent, but should not be present at concentrations which prevent crystallisation.

The anion is preferably selected from sulphonate, carboxylate, sulphinate, phosphonate, phosphate, phenate and thiophenate and the metal cation is an alkali metal or alkaline earth metal.

In preferred polyetherketones the temperature for the onset of crystallisation, Tc, is raised by at least 2° C. in comparison with a similar composition not containing the ionic end-groups, but useful polymers are obtained even when there is little or no change in Tc if sufficient nucleation results from the presence of end groups to increase the number of spherulites in comparison with a similar composition not containing the ionic end groups.

Polyetherketones according to the invention are most suitably produced by reaction of a preformed polyetherketone with reactive species containing the ionic group. Typical of such procedures are the reaction of a polyetherketone which already contains an end group which can be displaced by a nucleophilic reagent with a species containing a reactive nucleophilic group and a group of formula —A—X as hereinbefore defined. For example, the polyetherketone may have a terminal group selected from a fluoro, chloro or nitro group and the reactive species contains a nucleophilic group such as a phenate or thiophenate group, and a group of formula —A—X.

Alternatively, the preformed polyetherketone may contain a terminal nucleophilic group and the ionic ended polymer may be formed by reaction of this group with a low molecular weight compound carrying a group which can be displaced by a nucleophilic reagent, such as a chloro, fluoro or nitro group and the group of formula —A—X. It will be appreciated that a polyetherketone having a terminal nucleophilic group can be readily derived from a polyetherketone carrying a terminal group displaceable by a nucleophilic reagent. For example a fluorine ended polyetherketone can be reacted with the low molecular weight compound carrying a fluoro, chloro or nitro group and an —A—X group in the presence of a base which will replace the fluorine end group to give a nucleophilic end group.

In a further procedure a polyetherketone, regardless of the nature of its end-groups, preferably of high number average molecular weight, for example greater than about 10,000, is melted in the presence of a species having a nucleophilic group and a —A—X group under conditions which cause scission of the polyetherketone chain. The conditions which cause scission are enhanced if the reaction is done at high temperature or in the environment of a solution rather than a melt but are primarily affected by the nature of the polymer chain. Thus, polymers consisting predominantly of the repeat unit $$-O-Ph-O-Ph-CO-Ph-$$

(commonly known as PEEK) are less susceptible to chain scission by nucleophilic attack than polymers consisting predominantly of the repeat unit $$-Ph-O-Ph-CO-$$

(where Ph is phenylene in each case). In general, polyetherketones containing activated ether radicals are likely to be more susceptible to chain scission by nucleophilic reagents. It is preferred to use polymers of high molecular weight so that even after chain scission the products have useful properties. However, as shown later even low molecular weight products containing the ionic ends are useful in that they can influence the crystallisation behaviour of high molecular weight polyetherketones not containing ionic ends when a blend of the two components is present.

When the polyetherketone has a chemical structure in which the residues making up the polymer chain are not susceptible to electrophilic attack a crystallisable polyetherketone having ionic end groups can be prepared by reaction of a polyetherketone having suitable end-groups with an electrophilic reagent. For example, a polymer with the repeat unit —Ph—O—Ph—CO— and having fluorine end groups on the chain ends can be converted to a similar polymer having phenoxy end groups. These in turn can be sulphonated using sulphuric acid and subsequently neutralised with a chosen base to provide an ionic group.. Sufficient base may be added to wholly or partially neutralise the acid groups. An advantage of this method of preparation is that the polyetherketone chain does not suffer degradation during preparation of the nucleated polymer. The polymer of repeat unit —O—Ph—O—Ph—CO—Ph— is unsuitable for use in such manner because the in-chain residues are susceptible to attack by sulphuric acid.

Thus the invention provides a process of manufacturing a crystallisable polyetherketone comprising reacting (a) a polyetherketone carrying at least one terminal group which can be displaced by a nucleophilic reactant, with (b) a nucleophilic reagent carrying a group of formula —A—X where X is a metal cation, and —A— is an anion preferably selected from sulphonate, carboxylate, sulphinate, phosphonate, phosphate, phenate and thiophenate, or reacting (c) a polyetherketone carrying at least one terminal nucleophilic group and (d) a low molecular weight reactant carrying a reactive group which can be displaced by a nucleophilic reactant and a group of formula —A—X as hereinbefore defined or reacting (e) a polyetherketone susceptible to chain scission at elevated temperature and a compound of type (b)

or providing (f) a polyetherketone having in-chain residues which are not susceptible to electrophilic attack and end groups which are susceptible to electrophilic attack, reacting said polyetherketone with (g) an electrophilic reagent, and at least partially neutralising the resulting end group.

Although the procedures involving chain scission reduce the molecular weight of the preformed polymer the resulting product carrying an ionic group is thermally stable.

The procedures of reacting polyetherketones to provide the ionic ended polyetherketones of the invention can be carried out by a number of procedures including melt blending or reaction in solution. Although the fabricator would normally be supplied with a fully reacted polyetherketone already containing ionic end groups it is possible to supply the fabricator with a composition containing the unreacted ingredients which will react to give a polyetherketone having the ionised end groups as a result of thermal treatment in the fabrication stage.

Accordingly there is also provided a crystallisable polyetherketone composition which is a mixture of (a) a polyetherketone carrying at least one terminal group which can be displaced by a nucleophilic reactant, and (b) a nucleophilic reagent carrying a group of formula —A—X where X is a metal cation, and —A— is an anion preferably selected from sulphonate, carboxylate, sulphinate, phosphonate, phosphate, phenate and thiophenate or is a mixture of p0 (c) a polyetherketone carrying at least one terminal nucleophilic group and (d) a low molecular weight reactant carrying a reactive group which can be displaced by a nucleophilic reagent and a group of formula —A—X as hereinbefore defined or is a mixture of (e) a polyetherketone susceptible to chain scission at elevated temperatures and a compound of type (b).

The compositions will normally contain at least 0.1% by weight but less than 10% by weight of the additives (b) or (d) when it is desired to produce a substantial increase in the rate of nucleation. When the primary intention is to obtain a uniform spherulite size as little as 0.01% by weight can be effective. In general, a useful increase in the rate of nucleation is achieved when the metal ion concentration of the end groups in the polymer composition is at least 5 ppm, preferably greater than 25 ppm.

The nucleophilic reagent (b) carrying a —A—X group may be any reactant having such a group together with an end group capable of nucleophilic reaction. Particularly suitable are the compounds of formula NaO—Ar—SO$_3$Na and NaO Ar CO Ar O Ar SO$_3$Na, where Ar represents an aromatic radical, optionally ring-substituted, and is preferably a phenylene group.

The low molecular weight reactant (d) may typically be a compound of formula

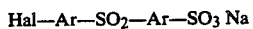

Hal—Ar—SO$_2$—Ar—SO$_3$Na or

F Ar CO Ar O Ar CO Ar O Ar SO$_3$Na where Hal is F or Cl and Ar is as hereinbefore defined and is preferably a phenylene group. Reactants (b) and (d) preferably contain only one reactive group.

Compositions of the invention which crystallise more rapidly than a polyetherketone composition not containing the ionic end group enable injection mouldings to be prepared having a more uniform degree of crystallisation through the thickness of the moulding. The compositions also enable the polymer to be coated onto wire to produce a coating having a substantially fully developed crystallinity so that the risk of the crystallinity of the coating continuing to increase during thermal cycling of the coated wire when it is in use is minimised.

It is believed that good nucleation is dependent upon the presence of a polyetherketone having the specified terminal ionised end-groups. Unionised acid groups are not effective at improving the nucleation rate in their own right. Nevertheless, an acid-ended polymer provides a useful intermediate compound which can be activated by the addition of simple bases or salts which provide an ionised end group. For example, polymers carrying —SO$_3$H end groups can be prepared from the polymers herein described, carrying —SO$_3$X end groups, by neutralisation with an acid. The specified —SO$_3$X or SO$_3$H groups should not be present to any significant extent except on the ends of polymer chains, as distinct from being pendant from polymer chains. Thus, linear polymer chains will contain at most two such end groups per polymer chain and branched chain polymers will contain the specified groups only on the ends of the branches.

The invention can be applied to any crystallisable polyaryletherketone which contains the recurring unit (I):

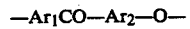

—Ar$_1$CO—Ar$_2$—O—

Such polymers will not normally have the specified end groups as a result of the polymerisation process, but these will be introduced by reaction of such polymer with an appropriate end-capping reagent. Polymers containing the recurring unit

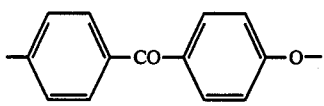

are disclosed, inter alia, in British patent specification No. 1 414 421 which describes such polymers containing the unit (I) as the sole repeating unit or in conjunction with the repeating unit (II):

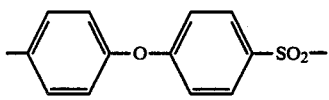

A preferred polyetherketone having the repeating unit (III):

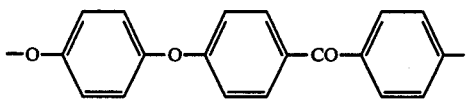

either alone or in conjunction with other repeating units is disclosed in European patent publication No. 1879. The other repeating units present in the polymers described in the European application may be of the repeating unit (IV):

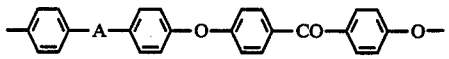

where A is a direct link, oxygen, sulphur, —SO₂—, —CO— or a divalent hydrocarbon radical. The repeat units may also be of formula (V):

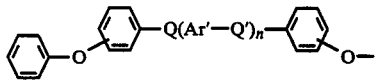

where the oxygen atom in the sub-units:

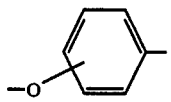

are ortho or para to the groups Q and Q', Q and Q' which may be the same or different are —CO— or —SO₂—, Ar' is a divalent aromatic radical, and n is 0, 1, 2 or 3.

The ability to control the crystallisation rate of a given polyetherketone having ionic ends is dependent on the molecular weight of the polymer. In general, it is more difficult to influence the crystallisation rate of polyetherketones which have a number average molecular weight of greater than 12,000 by direct modification of the polymer to produce ionised end groups. However, the compositions or products of the present invention are very useful for inducing an increased crystallisation rate or controlled morphology in high molecular weight polyetherketones which do not carry ionised end groups. Thus products of the invention having an ionisable component containing ether ketone units (—O Ph CO Ph—) with a number average molecular weight of 300 or more, for example 750 to 1,200 are very useful nucleation additives for higher molecular weight polyetherketones, for example those having a number average molecular weight of 10,000 or more and particularly those of greater than 15,000 or more where attempts to induce nucleation by end group control have proved difficult. The ionisable species used in such blends should not be reactive towards the other component of the blend if the result of such reaction produces a polyetherketone having no ionisable end group. Thus the ionisable species should have at least one ionisable end group not reactive towards the other polyetherketone component of the blend. It is preferred that the other end group is also not reactive towards the polyetherketone. Very small amounts of the ionic-ended oligo-or polyetherketones of the invention are effective in increasing the crystallisation rate of polyetherketones not carrying an ionised end group and having a number average molecular weight of at least 10,000. Thus as little as 0.1% by weight of ionic ended polyetherketone may have a significant effect on crystallisation rate, particularly when the number average molecular weight of the ionised additive is low, that is of the order of 1,000. As little as 0.01% by weight of ionic ended low molecular weight polyetherketone may have an effect on morphology. The ionised and non-ionised polymers of these polymer blends may be the same or different polyetherketones, as regards their repeat units.

The ability to induce crystallisation according to the invention is most pronounced when the group —A—X is the —SO₃X end group. The use of end groups such as a —COONa group is less effective, but may nevertheless be useful where only a moderate improvement in nucleation rate is required.

The improvement in crystallisation behaviour obtained by the use of the invention is accompanied by maintenance of the thermal stability of the polyetherketone. Thus the compositions and polymers of the invention may be maintained at temperatures sufficient to melt the polymers with little or no drop in number average molecular weight. Slight increases in number average molecular weight may occur.

The metal ion introduced by way of the end-capping procedure may be readily removed to give an acid end group which in turn may be neutralised with a different metal ion. Thus washing the polymer with a strong acid such as hydrochloric acid will substantially remove the sodium ion from a —SO₃Na ended polymer and reaction with LiOH by washing with an aqueous solution of LiOH will provide a —SO₃Li end group. The advantage of this procedure is that although the reactant most favourable for carrying out the end capping reaction may not confer the optimum crystallisation behaviour on the resulting polymer this may be readily exchanged for a cation more favourable to crystallisation by the exchange procedure. Thus useful polyetherketones include acid ended polymers as descried to which may be added a selected base or salt which will give rise to a nucleated polymer during subsequent processing. This step may be carried out by the fabricator. The extent of nucleation may be controlled by the extent to which acid end groups in a polymer are neutralised.

The compositions may also contain a variety of auxiliary additives, for example, for improving the thermal, oxidative and light stability of the polyetherketone or a variety of other additives such as fillers, pigments, colourants, flame retardants and mould release agents.

The compositions are particularly useful for use in engineering applications when they contain particulate or fibrous fillers because these materials can significantly enhance the mechanical properties of the composition. Of the fibrous fillers, glass fibre and carbon fibre are most widely used and are commercially available in a variety of types. The most suitable type for giving optimum levels of mechanical properties will depend to a significant extent on the nature of the size applied to the fibre. Manufacturers of fibres apply a variety of sizes for promoting bonding between the polymer and the fibre. The most suitable fibres may be chosen by examination of the properties obtained when the fibre is incorporated in the composition or the advice of the fibre manufacturer may be sought to obtain a fibre suitable for use in the polyetherketone compositions. The compositions may contain from 5 to 80% by weight of the composition of reinforcing fibre. The oligomeric nucleants are particularly useful when fillers are present in the composition.

Of particular interest is the use of the invention in high performance composites in which the fibre reinforcement is carbon fibre, and in particular, composites in which the fibres are present as parallel, aligned fibres in the composite article. Such composites are described in European Patent Application No. 56703. Although the fibres may be aligned in a single direction in the composite article optimum properties are obtained when articles are formed from pre-preg materials containing uniaxially aligned fibres which are laid up or interwoven to provide so-called quasi-isotropic reinforcement, the reinforcement in a given direction being provided by the uniaxial reinforcement of the individual pre-preg components. The present invention provides a means of improving such uniaxially or multiaxially reinforced articles in respect of the tolerance to damage when the article is subject to impact.

The composition may additionally, or alternatively, contain a variety of mineral fillers such as clays, mica, calcium metasilicate, glass beads, pulverised fuel ash and hollow glass spheres and other materials which act not only as cheap fillers but also significantly enhance some mechanical properties of the composition. As with the fibres it may be advantageous to use fillers which have been surface treated with adhesion-promoting materials such as silanes.

The compositions of the invention may also include other polymeric materials. The blend of such compositions will normally contain less than 50% of the composition of other polymeric materials.

The fast crystallising characteristics of the compositions of the invention may be determined by subjecting small samples of the composition to differential scanning calorimetry (DSC) techniques in addition to the practical test of determining the fastest rate at which articles may be injection moulded whilst retaining dimensional stability and good surface properties. The techniques used on small samples to examine the compositions of the present invention was as follows.

A 10 mg sample of the composition to be examined was weighed into an aluminium DSC pan and an aluminium lid was placed lightly on top of the composition. This combination was then placed on a hotplate which was maintained at 420° C. and the lid of the pan was pressed lightly down onto the composition as it melted. When the latter had flowed sufficiently to cover the base of the pan the combination was removed from the hotplate and allowed to cool. The vertical sides of the DSC pan were then crimped over the lid to seal the composition inside. This sealed pan was then returned to the hotplate and left, at 420° C., for 2 minutes before being rapidly transferred into iced-water to quench-cool it. The pan was subsequently dried by 'blotting' with tissues and then by holding in an oven at about 80° C. for 2 hours.

The dried 'test specimen' was then placed in the sensing head of a 'Perkin-Elmer' model DSC 1B instrument for examination. The sensitivity setting used was 'Range 8' and the temperature scanning rate 16° C./minute. The specimen was heated at 16° C./min from 75° C. to 420° C., recording Tg, Tn and Tp in the heating cycle. The specimen was then held at 420° C. for 2 minutes before being cooled at 16° C./min. to approximately 200° C., recording the Ts/Tc endotherm in the cooling cycle. Ts is the temperature for the onset of nucleation and Tc is the temperature of the peak of the endotherm.

Number average molecular weight values quoted in this specification for the polyetheretherketone, designated PEEK, were obtained by gel permeation chromatography (GPC) using the following conditions.

Apparatus: GPC 150° C. (Waters Associates) coupled to data collection and treatment systems Sigma 15 and Data Station 3600 (Perkin Elmer).

Separating System: Two Shodex "mixed bed" columns (Showa Denko) in Series (Code No. AD-80 M/S) the main characteristics of which were:
  Internal diameter: 8 mm
  Length: 250 mm
  Particle size: ca 10 $\mu$m
  Range: $50 \times 10^6$–100
  Number of theoretical plates: 6000/25 cm Stationary Phase: Semi-rigid styrene/divinyl benzene copolymer gel.

Eluent Phase: PhOH/1,2,4-TCB (50/50% w/w) stabilised with "Ionol" (200 mg/l).

Temperatures
  Reservoir/pump compartment: 60° C.
  Automatic injector compartment: 115° C.
  Columns/detector compartment: 115° C.

Detection System: Differential refractomer (RI)
  For PEEK:
    Attenuation 64
    Expansion factor 32

Flow Rate: 1 ml/min

Concentration and volume of solution of sample analysed:
  PEEK:
    Concentration: 1.5 mg/2 cm$^3$
    Volume: 80 $\mu$l Before injection, all the samples were filtered with 'Millipore' filters of porosity 0.5 um (Code Number FHLP 01300).

A calibration of the results was obtained from polymer samples measured using a light scattering method.

Number average molecular weights of polyetherketones were obtained by fluorine end group concentration analysis by 19F NMR spectroscopy. The polymer was dissolved in any suitable room-temperature solvent ($H_2SO_4$ or $CH_3SO_3H$). The concentration was between 2.5% and 5%. The fluorine concentration was obtained by integrating the areas under the peaks belonging to F end group and comparing them with the area under the peak of our external standard. $CF_3COOH$ was used as internal standard. The NMR device was a Brucker 250 $MH_2$ spectrometer fitted with a 19F probe.

The examination of the morphology effects arising from the invention were examined using a Stanton Redcroft Transmitted Light Hot Stage fitted with a fused quartz window and mounted on the rotating stage of an Olympus Model BH5-651P Polarising Microscope. Temperature control of the wet-stage heating block was by means of a Stanton Redcroft Universal Temperature Programmed—Code UTP/PR/5/B13. The operating procedure used to observe the crystallisation behaviour of PEEK and PEK polymers was as follows:

Test specimens were prepared by melt pressing about 5 mg of the polymer between microscope coverslips on a hotplate set at 380° C.–400C., depending on the polymer being examined. This produced a thin homogeneous film of the polymer sandwiched between the glass coverslips and this comprised the test specimen.

The test specimen was then placed on the heating block of the hot stage and the cover of the stage was then fitted. Nitrogen was passed through the chamber surrounding the specimen throughout the examination period. The test specimen was illuminated by polarised light and examined at various magnifications via crossed polars. The specimen was heated to 420° C. at 99°/min and held there for 2 mins before being cooled, at the same rate, to 325° C. where the specimen was allowed to crystallise isothermally.

The density and distribution of spherulite nuclei were observed, recorded and compared with controls as were the spherulite growth rates.

EXAMPLE 1

4,4'-difluorobenzophenone 22.48 g 0.103 M), hydroquinone (11.01 g 0.10 M) and diphenylsulphone (60 g) were charged to a 3-necked glass flask equipped with a stirrer, nitrogen inlet and an air condenser. These materials were heated with stirring to 180° C. to form a nearly colourless solution and, while maintaining a nitrogen blanket, anhydrous potassium carbonate (14.0 g 0.101 M sieved through a 300 μm sieve) was added. The temperature was raised to 200° C. and maintained there for 1 hour; the temperature was then raised to 250° C. and maintained there for 1 hour; finally the temperature was raised to 320° C.and maintained there for 1 hour the resulting polymer being in solution at this stage. The mixture was cooled (without end stopping) and the resulting solid reaction product was milled so as to pass through a 500 μm sieve. Diphenylsulphone and inorganic salts were removed by washing successively with acetone (twice), water (thrice), and acetone/methanol (twice).

The resulting solid polymer was dried at 140° C. under vacuum. The polymer which consisted of the repeat unit

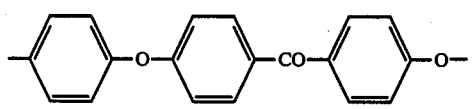

had a melt viscosity of 15 $Ns/m^2$ (number average molecular weight ca 7,000) measured at 400° C. on a ram extruder at a shear rate of 1000 $sec^{-1}$. The influence on the crystallisation properties of this polymer of compounds of type (b) was investigated by coating particles of the solid polymer with an aqueous solution of the salt by slurrying the polymer powder in the solution, to obtain a homogeneous deposition of the solution on the powder, drying the powder overnight (approximately 16 hours) at 120° C. in an air circulating oven.

The results obtained with various concentrations of additives are listed in the table below.

TABLE 1

| Additive | Crystallisation Behaviour (°C.) | | | | |
|---|---|---|---|---|---|
| (% by wt) | Tg | Tn | Tp | Ts | Tc |
| NIL | 133 | 163 | 347 | 307 | 296 |
| 0.5 NaOPhSO3Na | 134 | 162 | 348 | 318 | 314 |
| 1.0 NaOPhSO3Na | 133 | 160 | 347 | 319 | 314 |
| 1.0 LiOPhSO3Li | 133 | 166 | 348 | 312 | 308 |

The table indicates a significant increase in Tc is achieved by the use of the salts.

EXAMPLE 2

The examination was repeated with a similar polymer except in that it had a melt viscosity of 11 $Ns/m^2$ (number average molecular weight about 6000). The results obtained were as follows:

TABLE 2

| Additive (% by wt) | Tg | Tn | Tp | Ts | Tc |
|---|---|---|---|---|---|
| NIL | 134 | 161 | 348 | 309 | 303 |
| 1.0 NaOPhSO3Na | 133 | 160 | 349 | 318 | 314 |
| 3.1 NaOPhSO3Na | 136 | 161 | 348 | 321 | 315 |

EXAMPLE 3

A polyetheretherketone powder having the repeat unit of the polymer used in Example 1 but having a melt viscosity at 400° C. of 91 $Ns/m^2$ (number average molecular weight about 12,000) was treated with 1% by weight of the compound of formula Na O Ph $SO_3$ Na by the slurry process used in Example 1. No significant effect on the crystallisation properties was observed as measured by the DSC technique described above.

EXAMPLE 4

A polyetheretherketone polymer having a melt viscosity at 400° C. of 120 $Ns/m^2$ was used to prepare a composition by the slurry procedure of Example 1 in which sufficient salt (Na O Ph $SO_3$ Na) was present to provide for the theoretical replacement of 1 end group per polymer molecule by $a$—$SO_3$ Na group. Thus 21.8 g of salt was distributed on 1200 g polymer by the slurry technique. The dried product was then heated in 2320 g diphenyl sulphone (DPS) at 310° C. for 3½ hours. The product obtained was separated from the DPS and the crystallisation properties measured. The following results were obtained.

TABLE 3

| Additive (% by wt) | Tg | Tn | Tp | Ts | Tc |
|---|---|---|---|---|---|
| NIL | 141 | 179 | 344 | 293 | 281 |
| 1.82 | 143 | 178 | 341 | 296 | 291 |

This example indicates that the crystallisation properties of high molecular weight polymers can be improved provided that appropriate reaction conditions are used.

EXAMPLE 5

1 part of the product of Example 4 was added to 9 parts of a polyetheretherketone (PEEK) having a number-average molecular weight of about 12,000. The blend was homogenised by passing through a melt flow grader at a temperature of 400° C. and the crystallisation properties of the extruded product determined by DSC.

|  | Crystallisation Properties (°C.) | | | | |
|---|---|---|---|---|---|
|  | Tg | Tn | Tp | Ts | Tc |
| (a) 9 Parts of PEEK (Mn = 12000) + (b) 1 Part of Product of Example 4 | 141 | 178 | 342 | 298 | 293 |
| (a) Alone | 141 | 179 | 344 | 293 | 281 |
| (b) Alone | 143 | 178 | 341 | 296 | 291 |

EXAMPLE 6

The polymer composition as prepared in Example 1 was heated in air at 300° C. for varying periods (detailed below) and the product was then washed in water and acetone to remove any unreacted salt. The crystallisation properties of the resultant products are given below.

TABLE 4

| Additive | Heating | Crystallisation Properties | | | | |
|---|---|---|---|---|---|---|
| (% by wt) | Time (min) | Tg | Tn | Tp | Ts | Tc |
| NIL | — | 133 | 163 | 347 | 307 | 296 |
| 1.0 NaOPhSO3Na | 5 | 133 | 160 | 348 | 319 | 314 |
| 1.0 NaOPhSO3Na | 30 | 134 | 163 | 347 | 318 | 313 |

EXAMPLE 7

4,4' Fluorohydroxybenzophenone (21.62 g., 0.10 M) 4,4'difluorophenzophenone (0.65 g, 0.003 M) and diphenyl sulphone (40.0 g) were charaged to a 3-necked flask equipped with a stirrer, nitrogen inlet and an air condenser. These materials were heated to 160° C. while stirring and, while maintaining a nitrogen blanket, anhydrous sodium carbonate (5.40 g, 0.051 M) was added. The temperature was raised in stages to 175° C. (0.5 hours), 200° (0.5 hours), 225° (1.0 hours) and finally 320° for 2 hours. The polymer was isolated as in Example 1 and had a melt viscosity of 12 Ns/m² measured at 400° C. and a shear rate of 1000 sec $^{-1}$. The intrinsic viscosity of the polymer measured as a 0.1% by weight solution in sulphuric acid at 25° C. was 0.35.

The polymer had a repeat unit of formula

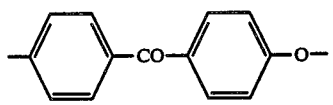

This product was treated by the slurry process of Example 1 to provide polymer samples containing respectively the concentrations of salt shown in Table 5 below.

TABLE 5

| Additive | Crystallisation Properties (°C.) | | | | |
|---|---|---|---|---|---|
| (% by wt) | Tg | Tn | Tp | Ts | Tc |
| NIL | 141 | 169 | 379 | 334 | 326 |
| 1.0 NaOPhSO3Na | 142 | 170 | 379 | 347 | 343 |
| 3.11 LiOPhSO3Li | 142 | 170 | 379 | 350 | 344 |

EXAMPLE 8

1 part of the product of Example 1 (powder carrying salt) was added to 9 parts of a polyetheretherketone (PEEK) having a number average molecular weight of about 12,000. The blend was homogenised by passing through a melt flow grader at a temperature of 400° C. and the crystallisation properties of the extruded product determined. The experiment was repeated using 1 part of the polyetherketone (PEK) polymer composition of Example 6 together with 9 parts of the high molecular weight polyetheretherketone (number average molecular weight ca 12,000). The following results were obtained.

TABLE 6

| Sample | Crystallisation Properties (°C.) | | | | |
|---|---|---|---|---|---|
|  | Tg | Tn | Tp | Ts | Tc |
| (a) 9 parts PEEK (Mn = 12000) + (b) 1 part PEEK (Mn = 7000) + 3.1% by weight of (b) of NaOPhSO3Na |  |  |  |  |  |
| (a) alone | 141 | 179 | 344 | 293 | 281 |
| 9 parts (a) + (c) 1 part PEK (12 Ns/m²) + 1% by wt of (c) of NaOOSO3Na | 142 | 176 | 345 | 305 | 298 |
| (a) + (c) | 142 | 178 | 347 | 300 | 283 |

EXAMPLE 9

The effect of prolonged elevated temperatures on the crystallisation capability of the compositions of the invention were determined as follows. A dry polymer composition (15 g) obtained by the slurry method of Example 1 and containing 3.3% by weight of NaOPhSO3Na was added to 150 g benzophenone at 300° C.±2° C. Samples were taken at intervals and immediately precipitated in acetone. After washing successively with acetone, water and acetone respectively, the polymer samples were dried and subjected to DSC examination. The polymer used was a polyetheretherketone having a number average molecular weight of 9,000. The results are reported in Table 7.

TABLE 7

| Additive Reaction Time | | Crystallisation Properties | | | | Number Average Molecular Wt Mn |
|---|---|---|---|---|---|---|
| (% by wt) | (min) | Tg | Tn | Tp | Tc |  |
| NIL | 60 | 139 | 168 | 348 | 299 | 10,000 |
|  | 250 | 137 | 167 | 347 | 301 | 9,300 |
| 3.3 NaOPhSO3Na | 15 | 141 | 166 | 349 | 309 | 9,600 |
|  | 30 | 139 | 165 | 348 | 310 | 9,600 |
|  | 120 | 138 | 164 | 348 | 312 | 9,500 |
|  | 240 | 139 | 164 | 348 | 313 | 9,500 |

The stability of the crystallisation behaviour at 400° was determined by holding samples in the DSC cell, under nitrogen, for varying periods. The polymer used had been prepared by the solution process described in this example using a reaction time at 300° C. of 370 minutes. The results obtained are given in Table 8.

TABLE 8

| Heating Time (min) | Crystallisation Properties (°C.) | | | |
|---|---|---|---|---|
| | Tg | Tn | Tp | Tc |
| 2 | 139 | 164 | 348 | 315 |
| 10 | 139 | 164 | 347 | 315 |
| 30 | 138 | 165 | 347 | 313 |

EXAMPLE 10

The effect of removing the metal ion of the end group was examined by washing a polymer composition prepared by the process of Example 9 with hydrochloric acid. A polyetheretherketone of number average molecular weight 9,000 was reacted with 3.3% by weight of $NaOPhSO_3$ for 370 minutes at 300° C. using benzophenone as solvent (Sample (b)). The washed and dried product was further washed with a mixture of 50 ml acetone and 0.2 ml of 37% HCl for 100 mg of dried polymer for a period of 1.5 hours (Sample (c)). A sample of the PEEK polymer, before salt treatment, was washed with HCl as the control (Sample (a)). The crystallisation properties of the product are shown in Table 9.

TABLE 9

| Sample | Crystallisation Properties (°C.) | | | |
|---|---|---|---|---|
| | Tg | Tn | Tp | Tc |
| (a) Polymer alone (HCl washed) | 137 | 167 | 347 | 300 |
| (b) Composition treated with salt as described, before HCl wash | 139 | 164 | 348 | 315 |
| (c) As (b) after HCl wash | 139 | 164 | 348 | 301 |

EXAMPLE 11

The effect of a variety of cations on the crystallisation properties was assessed by first following the procedure of Example 10 to remove the sodium cation and subsequently replacing it with the cations listed in Table 10. This was effected by stirring 0.2 g of the acidified polymer (obtained as in Example 10 from a polymer of number average molecular weight 10,000) in 50 ml of a 2N salt solution in methanol, where the salt is the appropriate chloride. The product was washed with methanol and dried. The effect on crystallisation temperature and number average molecular (as a result of the thermal history experienced in the DSC test) is given in Table 10.

TABLE 10

| Cation | Tc (°C.) | Molecular Weight (Mn) |
|---|---|---|
| None | 296.6 | 10,400 |
| $Li^+$ | 314.6 | 10,200 |
| $Cs^+$ | 315.7 | 8,900 |
| $Mg^{++}$ | 307.9 | — |
| $Ca^{++}$ | 314.4 | 10,000 |
| $Cu^{++}$ | 307.0 | — |
| $Zn^{++}$ | 312.3 | 10,400 |

EXAMPLE 12

The solution treatment procedure described in Example 9 was used in an attempt to react a salt of formula NaOPhCOONa with the polyetheretherketone of Example 1 having a number average molecular weight of 9,000. 3.3% by weight of NaOPhCOONa was slurry blended on to the PEEK powder and dried. The product was heated in benzophenone at 300° C. for 355 minutes, samples being taken at intervals to examine whether any increased crystallisation had been achieved. The results are quoted in Table 11.

TABLE 11

| Sample | Time of Reaction (min) | Crystallisation Properties (°C.) | | | |
|---|---|---|---|---|---|
| | | Tg | Tn | Tp | Tc |
| | NIL | 139 | 168 | 348 | 307 |
| | 30 | 139 | 168 | 348 | 307 |
| | 120 | 137 | 167 | 347 | 301 |
| | 240 | 140 | 170 | 345 | 313 |
| | 355 | 140 | 170 | 349 | 298 |

EXAMPLE 13

Two grams of a compound of formula Ph—O—Ph—C O—Ph—OH (where Ph is phenylene) was sulphonated by stirring overnight in 6 ml of concentrated sulphuric acid. The product was precipitated in HCl-acidified water (80 ml). The product was isolated by filtering washing with acidified water and drying in vacuum at ambient temperature. The dried product was saponified with sodium hydroxide to the second equivalent point. A product was isolated by evaporation of water and confirmed by infra red measurement to have the formula Na $SO_3$ PhO Ph COPh O Na.

The product was deposited as an aqueous solution of salt on a polymer powder prepared as in Example 1 except in that the melt viscosity of the polyetheretherketone corresponded to number average molecular weight of 10,000, and the concentration of salt by weight of polymer was 2.8%. The coated powder was isolated by drying overnight (16 hours) at 120° C. in an air circulating oven. 15 gram of this product was added to 150 g benzophenone and heated at 300° C.±2° C. for the periods shown in the table below.

In order to evaluate the effect of different cations salts were prepared using appropriate bases to contain lithium and potassium cations respectively. The nucleating effect of these salts was measured following the above procedure and measuring the crystallisation characteristics by the DSC technique.

TABLE 12

| Cation | Reaction Time (min) | Tc |
|---|---|---|
| Na | 15 | 319.7 |
| | 300 | 319.9 |
| K | 15 | 319.8 |
| | 300 | 315.9 |
| Li | 15 | 307.7 |
| | 300 | 314.8 |
| Control | — | 303.3 |

EXAMPLE 14

The stability of the nucleation enhancement in respect of elevated temperatures was assessed by holding samples at elevated temperatures for varying periods in the open cell of the DSC apparatus whilst blanketed with nitrogen. The values of Tc obtained after the various holding conditions are given in Table 13.

TABLE 13

| Holding Conditions | | Tc | | |
|---|---|---|---|---|
| Temperature (°C.) | Time (min) | Sample A* | Sample B* | Sample C* |
| 400 | 2 | 303.3 | 315.3 | 319.2 |
| 410 | 2 | 303.1 | | 317.2 |
| 420 | 2 | 303.5 | | 317.5 |
| 430 | 2 | 305.8 | | 317.0 |
| 430 | 30 | 304.3 | | 314.4 |
| 400 | 5 | | 314.9 | |
| | 10 | | 314.8 | |
| | 20 | | 314.5 | |
| | 30 | | 313.4 | |

*Sample A was a polyetheretherketone of Mn = 10,000.
Sample B was the same polymer as sample A containing 2.8% by weight NaOPh-SO₃Na (reacted in benzophenone at 300° C. for 300 min).
Sample C was the same polymer as sample A containing 2.8% by weight NaOPh-COPhOPhSO₃Na (reacted in benzophenone at 300° C. for 300 min).

EXAMPLE 15

In this Example an ionic polymer was prepared by direct sulphonation of a suitable polyetherketone, followed by neutralisation of the sulphonic acid group.

105 g of the polyetherketone prepared in Example 7, having a number average molecular weight of 6,500 (measured by fluorine end group analysis by F19 NMR) was mixed with sodium phenate (3.5 g) and diphenyl sulphone (200 g) in a glass flask and heated to 350° C. whilst being stirred. After 5 hours the mixture was poured into a tray formed from aluminium foil and then purified by washing to remove.

2 g of the isolated product was treated with 100% sulphuric acid at room temperature for 24 hrs. The resulting product was isolated by precipitation in water and washing with water. The isolated product was neutralised by immersing the product in N sodium hydroxide for 2 hrs. The product was washed with water at pH =7.

The polymer was calculated to have a number average molecular weight of 6,980 from the F end group analysis value on the fluorine-ended starting material.

Elementary analysis for sodium (6590 ppm) corresponded with both chain ends being in the form of —SO₃Na groups. No fluorine end groups were detected by 19F NMR. This product was designated Polymer X.

The polymer X was found to have a Tc value of 322° C.

The crystallisation behaviour of blends of polyetherketones of various molecular weights and various proportions of polymer X were evaluated. Blending of the polymers was effected in benzophenone at 300° C. for 5 mins (using 10 parts by weight of mixed polymers in 90 parts solvent). The blended solution was precipitated in acetone. The results obtained are shown in Table 14.

TABLE 14

| Blend (% by wt) | | Tc (°C.) |
|---|---|---|
| Polymer X | | |
| PEEK* | | |
| 0 | 100 | 309 |
| 0.1 | 99.9 | 310 |
| 1 | 99 | 317 |
| 2 | 98 | 318 |
| 5 | 95 | 320 |
| 10 | 90 | 319 |
| 20 | 80 | 319 |
| PEEK** | | |
| 0 | 100 | 290 |
| 0.2 | 99.8 | 290 |
| 1 | 99 | 292 |
| 2 | 98 | 298 |
| 5 | 95 | 300 |
| 10.7 | 89.3 | 299 |
| 20 | 80 | 297 |
| PEEK*** | | |
| 0 | 100 | 335 |
| 0.1 | 99.9 | 337 |
| 1 | 99 | 346 |
| 2 | 98 | 349 |
| 6 | 94 | 351 |
| 10 | 90 | 351 |
| 20 | 80 | 351 |
| 50 | 50 | 345 |
| PEEK**** | | |
| 0 | 100 | 307 |
| 0.3 | 99.7 | 322 |
| 1 | 99 | 329 |
| 2 | 98 | 330 |
| 5 | 95 | 330 |
| 10 | 90 | 329 |
| 20 | 80 | 330 |

*A polyetheretherketone of Mn = 10,000 (by GPC)
**A polyetheretherketone of Mn = 16,800 (by GPC)
***A polyetherketone of Mn = 6,500 (by F end Group)
****A polyetherketone of Mn = 10,000.

The polymer was shown to have end groups of the formula

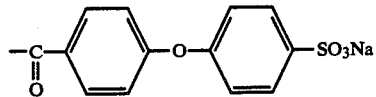

by infrared and ¹³C nuclear magnetic resonance measurements. The spectroscopic characteristics of these end groups are as follows:

Infrared spectroscopy—absorbances at 1010 cm⁻¹, 734 cm⁻¹, 602 cm⁻¹, 577 cm⁻¹ and 561 cm⁻¹.

¹³C NMR spectroscopy—chemical shifts at 117.4 ppm, 118.6 ppm, 127.2 ppm, 135.0 ppm, 157.6 ppm and 159.9 ppm.

[NB—as these chemical shifts were measured on a dichloracetic acid solution the end group is likely to be

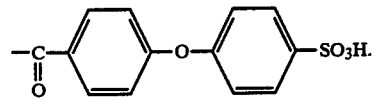

Thus both IR and ¹³C NMR needed].

Experimental conditions used for the ¹³C NMR and Infrared spectroscopic evaluations were as follows.

The ¹³C NMR spectra were measured on a JEOL FX270 spectrometer (operating in the Fourier Transform mode) and the 67.8 MHz spectra were taken on solutions of polymers in dichloroacetic acid. Protons were decoupled from ¹³C nuclei by broad-band irradiation and spectra were taken with nuclear Overhauser enhancement. Parameters used for acquiring spectra were: Spectral window—8KHz Acquisition time for the free induction decay (FID-)—1.02 seconds.

Temperature of sample ~30° C.

Pulse length: 20 μs, equivalent to 90° tip angle.

16K data points were transformed and usually ~30,000 spectra were accumulated.

Quenched hot pressed films of very fine amorphous powder were dissolved in the solvent (10% w/w). The polymer solutions were contained in a 10 mm outside diameter (OD) NMR tube and concentrically within this tube was a 5 mm OD NMR tube which contained deuterated dimethyl sulphoxide ($d_6$-dmso). The deuterium resonance from the $d_6$-dmso provided a signal to optimise magnet field homogeneity and the $^{13}C$ NMR resonance from the $d_6$-dmso was used for referencing of chemical shift values. The central resonance from the multiplet resonance from $d_6$-dmso was taken as 39.6 ppm. On this scale the resonances from the carbons in the PEK repeat unit occur at chemical shift values: 117.9 ppm, 131.0 ppm, 132.2 ppm, 159.5 ppm and 197.8 ppm corresponding to carbons 2, 4, 3, 1 and 5 in the structure below.

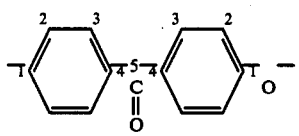

All infrared spectroscopic data were taken on a Nicolet Fourier Transform spectrometer, type 170SX, which was fitted with a MCT (mercury cadmium telluride) liquid nitrogen cooled detector. The spectrometer parameters were set to give two wave number resolution (8192 data points) and 1000 scans were accumulated. Wherever possible samples were prepared as thin films (thickness <200 μm) by compression moulding at 400° C. followed by quenching into water at ~15° C. When this procedure was not possible or there was a suspicion of degradation, samples were prepared at room temperature by hand grinding with pestle and mortar and milling with liquid paraffin (nujol).

As the end groups of interest are only a small part of the molecule the intensities of the infrared absorption bands specific to the end groups are also small and are difficult to detect. The software on the Nicolet 170SX enables the operator to view the difference between two spectra thus highlighting absorption bands from the end groups relative to the remainder of the spectrum.

EXAMPLE 16

The nucleation properties of the polymer when used in a mixture with a polyetheretherketone of Mn=10,000 (blended as in Example 15) is shown in the table below. It was not possible to measure the Tc value for the ionic ended polymer itself because it did not melt.

TABLE 15

| Blend (% by wt) | | | |
|---|---|---|---|
| Polymer Y | Calculated sodium content | PEEK* | Tc (°C.) |
| 0.56 | | 99.44 | 311 |
| 1 | 180 | 99 | 315 |
| 2 | 360 | 98 | 316 |
| 5 | 900 | 95 | 317 |
| 10 | 1800 | 90 | 317 |
| 20 | 3600 | 80 | 318 |
| 40 | 7200 | 60 | 320 |

EXAMPLE 17

The Example shows that the nucleation effects of the compositions of the invention are obtained when the compositions are used to prepare carbon fibre composites.

A polymer composition consisting of a blend of 10% by weight of a polyetherketone prepared according to Example 7 and 90% by weight of a polyetheretherketone having a melt viscosity of 100 $Ns/m^2$ at 400° C. was mixed with diphenyl sulphone in the weight ratio 50:50. Continuous carbon fibre rovings (Hercules AS4 supplied by Hercules Corp.) were drawn through a melt of the mixture maintained at 400 C., using the procedures described in European Patent publication No. 102159. The diphenyl sulphone was volatilised from the composite after impregnation of the fibres had taken place. A product was obtained containing 68% by weight of carbon fibres in which the individual filaments were essentially completely wetted by the polymer composition.

The crystallisation characteristics were evaluated using the DSC technique previously detailed. In comparison with a control material made in an identical manner, except in that the ionic-ended polymer was omitted from the blend of polymers, the composition showed an increase in Tc of 19° C. (287° C.v.306° C).

A similar increase in Tc (compared with the control polymer was found using the same procedure to form a composite from a polymer composition containing 10% by weight of the polymer of Example 7 and 90% by weight of polyetheretherketone if melt viscosity 150 $Ns/m^2$ (measured at 400° C.). A Tc increase of 17° C. was observed.

The stability of increase in Tc was measured on the composite containing 10% by wt polymer of Example 7 and 90% by weight polyetheretherketone of melt viscosity 150 $Ns/m^2$ by moulding the composition at temperatures between 400° C. and 440° C. in comparison with mouldings of the control composite containing only the polyetheretherketone of melt viscosity 150 Ns/,$^2$. The moulding procedure used was to place the composition in a matched mould at the specified temperature for 15 minutes to allow it to equilibrate before consolidation for 5 minutes under 5 tonnes pressure. The sample was then cooled at 10°/min. These results are shown in Table 16.

TABLE 16

| Polymer in Composite (% by wt) | Moulding Temperature (°C). | Tc (°C.) |
|---|---|---|
| 10% PEK (Ex 7)/90% PEEK (150 $Ns/m^2$) | 400 | 305 |
| | 410 | 304 |
| | 420 | 304 |
| | 440 | 303 |
| 100% PEEK (150 $Ns/m^2$) | 400 | 288 |
| | 410 | 282 |
| | 420 | 284 |
| | 440 | 277 |

EXAMPLE 18

The procedure of Example 7 was used to prepare a polyetherketone having a melt viscosity of 400 $Ns/m^2$ This polymer was slurry blended as in Example 7 with 5% by weight of Na O Ph $SO_3$ Na. The resulting composition had a Tc of 315° C. compared with 296° C. for the untreated polyetherketone.

For comparison the experiment was repeated using the polymer of Example 7 (melt viscosity=12 Ns/m²) also slurry blended with 5% by weight of Na O Ph SO₃ Na. The Tc values obtained were 326° C. for the control of untreated polymer and 345° C. for the slurry blended composition.

EXAMPLE 19

A series of sulphonated oligomers containing respectively 3,5 and 7 phenylene rings was prepared as follows.

3-ring oligomer

Benzoic acid (2.4 g) and diphenylene ether (3.4 g) were added to trifuluoromethane sulphonic acid (15 ml). The mixture was stirred under nitrogen for 2 hrs. and then poured into cold water (1 liter) with stirring. The product was filtered, dried and recrystallised from heptane. The product in the form of fine white needles had a melting point of 70°-71° C.

1 g of this product was dissolved in 98% conc sulphuric acid (10 ml) at room temperature. The solution was stirred overnight under nitrogen and then poured into cold water (100 ml). Solid sodium hydroxide was added until the mixture was alkaline. The product was filtered off and washed with water until the washings were neutral. The product was recrystallised from water. The product was designated "Oligomer 3S"

5 ring oligomer

A 3-ring phenol was prepared by mixing 4-hydroxy benzoic acid (27.6 g) and diphenyl ether (34 g) in 200 ml trifluoromethane sulphonic acid and stirring under nitrogen at room temperature for 2 hrs. The mixture was added dropwise to cold water (3 liter) whilst stirring. The product was filtered off and recrystallised from methanol/water. The product had a melting point of 158°-9° C.

5.4 g of this product was added with anhydrous potassium carbonate (1.4 g) to diphenylsulphone (15 g). The mixture was heated to 200° C. under nitrogen whilst stirring. When the effervescence ceased a mixture of 4 fluorobenzophenone (4.4 g) in diphenylsulphone (15 g) was added and heated to 200° C. for 3 hrs. under nitrogen. The mixture was allowed to cool and then extracted with hot methanol until no diphenylsulphone remained. The product was then extracted with hot water until no salt was present. The product wad dried and recrystallised from toluene. The product had a melting point of 186°-7° C.

This 5-ring product was sulphonated as described for the 3-ring oligomer and recrystallised from N methyl pyrrolidone. The product was designated "Oligomer 5S".

7 ring oligomer

A 3 ring fluoride was prepared by adding 4 fluorobenzoic acid (14 g) and diphenyl ether (17 g) to trifluoromethane sulphonic acid (100 ml). The mixture was stirred for 2 hrs. at room temperature under nitrogen. The mixture was poured into cold water (1 liter) whilst stirring. The precipitated product was filtered, washed with 10% sodium carbonate solution and finally water. After drying the product was recrystallised from heptane. The product had a melting point of 100°-101° C.

A 4 ring fluoride was prepared from this product as follows. 8.8 g of the above product and benzoyl chloride (14.5 g) was stirred under nitrogen at 150° C. When homogeneous anhydrous ferric chloride (1.8 g) was added and stirring continued for 1 hr at 150° C. and then a further 1 hr at 170° C. under nitrogen 2-ethoxyethanol (150 ml) was cautiously added and heated until a solution was obtained. The solution was filtered hot and the filtrate allowed to cool. The product crystallised and was filtered off. The product had a melting point of 195°-196° C.

A 7 ring oligomer was prepared from this 4 ring fluoride using the procedure described for the 5 ring oligomer except in that the 4-fluoro benzophenone was replaced with the 4 ring fluoride (8 g). The product obtained had a melting point of 255°-7° C. This product was sulphonated as described for the 3 ring oligomer except in that it was recrystallised from N-methyl pyrrolidone. This product was designated "Oligomer 7S".

These sulphonated oligomers were evaluated as nucleants, at a concentration of 1% by weight, for polyetheretherketone (PEEK) and polyetherketone (PEK). Blending was effected by dry blending the powdered materials. The results are shown in the following table.

TABLE 17

| Oligomer | Polymer | Ts(°C.) | Tc (°C.) |
|---|---|---|---|
| 0 | PEEK* | 312 | 304 |
| 3S | PEEK | 314 | 309 |
| 5S | PEEK | 316 | 311 |
| 7S | PEEK | 319 | 314 |
| 0 | PEK** | 334 | 326 |
| 3S | PEK** | 344 | 339 |
| 5S | PEK** | 343 | 339 |
| 7S | PEK** | 347 | 342 |

*PEEK of Mn = 3,000
**PEK of Mn = 7,000 (from Example 7)

EXAMPLE 20

Hydroquinone (16.5 g), Cl-Ph-CO-Ph-CO-Ph-Cl (where Ph is phenylene) (53.5 g) were added to diphenyl sulphone (138 g) together with sodium carbonate (15.9 g). The mixture was gradually heated to 210° C. and then maintained under the following temperature schedule.

210° C./1 hr, 230° C./1 hr, 260° C./1 hr, 290° C./1 hr, 320° C./2 hrs., 270° C./17 hrs., 320° C./1 hr and then cooled to room temperature. The product was washed six times using a methanol/water mixture, washed six times using water/acetic acid and finally with water/acetone. A 95% yield of a grey powder was obtained. The product was moulded into film form at 390° C. for 5 mins. The film formed was tough as judged by repeated bending of the film on itself.

The polymer obtained (9 parts by weight) was mixed with the nucleant polymer prepared in Example 7 (1 part by weight). The Ts and Tc values of this blend were 318° C. and 304° C. respectively. The Ts and Tc values of the polymer without the added nucleant were 295° C. and 293° C. respectively.

EXAMPLE 21

The low molecular weight polyetherketone prepared in Example 7 (Mn=7000) was slurry blended in water as described in Example 1 with 2 moles per mole of polymer for reaction with both fluorine end groups) of the following naphthalene compounds I and II.

Structure I: naphthalene with $KSO_3$—, $SO_3$ (top), and —OK substituents

Structure II: naphthalene with $SO_3Na$ and —ONa substituents

These products were further blended with unionised polyetherketone as prepared in Example 7.

The crystallisation behaviour (Tc) measured by standard procedure detailed is recorded below.

TABLE 18

| Composition | Crystallisation Behaviour Tc (°C.) |
|---|---|
| (a) PEK (Mn 7000) + I | 279 |
| (b) 10 parts (a) + 90% PEK (Mn 7000) | 323 |
| (c) 2 parts (a) + 98% PEK (Mn 7000) | 334 |
| (d) PEK (Mn 7000) + II | 292 |
| (e) 10 parts (c) + 90 parts PEK (Mn = 7000) | 330 |
| (f) 2 parts (c) + 98 parts PEK (Mn = 7000) | 333 |

We claim:

1. A crystallisable thermoplastic aromatic polyetherketone, the polymeric chain of which contains the repeat unit $$-Ar_1-CO-Ar_2-O-$$

where $Ar_1$ and $Ar_2$ are aromatic radicals which may be the same or different and comprise at least one aromatic ring, the polymeric chains having terminal ionic groups of formula —A—X, where A is an anion selected from the group consisting of sulphonate, carboxylate, sulphinate, phosphonate and phosphate and A is linked by a chemical bond to the polymer chain and X is a metal cation.

2. A crystallisable thermoplastic aromatic polyetherketone according to claim 1 wherein $Ar_1$ and $Ar_2$ comprise single, condensed or multiple aromatic rings, the multiple rings being joined by a chemical bond or a linking group D selected from —O—, —S—, —CO— and —O—(CH$_2$)$_2$—O—.

3. A crystallisable thermoplastic aromatic polyetherketone according to claim 1 wherein the metal cation is an alkali metal or alkaline earth metal.

4. A crystallisable thermoplastic aromatic polyetherketone composition comprising a blend of a polyetherketone according to claim 1 and a polyetherketone not containing terminal ionic groups.

5. A composition according to claim 4 wherein the blend contains at least 0.1% by weight of the composition of the polymer containing the ionic terminal group.

6. A composition according to either of claim 4 or claim 6 wherein the polyetherketone containing a terminal ionic group is an oligomer of molecular weight at least 300.

7. A composition according to claim 1 containing particulate or fibrous fillers.

8. A process of manufacturing a crystallisable polyetherketone comprising reacting
   (a) a polyetherketone carrying at least one terminal group which can be displaced by a nucleophilic reactant, with
   (b) a nucleophilic reagent carrying a group of formula —A—X where X is a metal cation, and —A— is an anion selected from the group consisting of sulphonate, carboxylate, sulphinate, phosphonate and phosphate.

9. A process according to claim 8 wherein the concentrations of components (b) and (d), when used, is between 0.1 and 10% by weight of the reactants present.

10. A crystallisable polyetherketone composition suitable for generating a polyetherketone having ionic end groups when the composition is melted comprising a mixture selected from the groups (a) plus (b), (c) plus (d) and (e) plus (h) wherein
    (a) is a polyetherketone carrying at least one terminal group which can be displaced by a nucleophilic reactant,
    (b) is a nucleophilic reagent carrying a group of formula —A—X where X is a metal cation, and —A— is an anion selected from the group consisting of sulphonate, carboxylate, sulphinate, phosphonate and phoshate
    (c) is a polyetherketone carrying at least one terminal nucleophilic group,
    (d) is a low molecular weight reactant carrying a reactive group which can be displaced by a nucleophilic reagent and a group of formula —A—X where X is a metal cation and —A— is an anion selected from the group consisting of sulphonate, carboxylate, sulphinate, phosphonate, phosphate, phenate and thiophenate,
    (e) is a polyetherketone susceptible to chain scission at elevated temperatures and
    (h) is a nucleophilic reagent carrying a group of formula —A—X where X is a metal cation, and —A— is an anion selected from the group consisting of sulphonate, carboxylate, sulphinate, phosphonate, phosphate, phenate and thiophenate.

11. A shaped article formed from a polyetherketone according to claim 1 or a polyetherketone composition according to claim 4.

12. A process of manufacturing a crystallisable polyetherketone comprising reacting
    (c) a polyetherketone carrying at least one terminal nucleophilic group and
    (d) a low molecular weight reactant carrying a reactive group which can be displaced by a nucleophilic reactant and a group of formula —A—X where X is a metal cation and —A— is an anion selected from the group consisting of sulphonate, carboxylate, sulphinate, phosphonate, phosphate, phenate and thiophenate.

13. A process of manufacturing a crystallisable polyetherketone comprising reacting
    (e) a polyetherketone containing activated ether radicals susceptible to chain scission at elevated temperature with
    a nucleophilic reagent carrying a group of formula —A—X where X is a metal cation, and —A— is an anion.

14. A process as set forth in claim 13 in which the group X is selected from the group consisting of sulphonate, carboxylate, phosphonate, phenate and thiophenate.

15. A process of manufacturing a crystallisable polyetherketone comprising providing
    (f) a polyetherketone having in-chain residues which are not susceptible to electrophilic attack and end groups which are susceptible to electrophilic attack, and reacting said polyetherketone with
    (g) an electrophilic reagent, and at least partially neutralising the resulting end group.

* * * * *